US007872592B2

(12) United States Patent
Greenhoe

(10) Patent No.: US 7,872,592 B2
(45) Date of Patent: Jan. 18, 2011

(54) WARNING LIGHT

(75) Inventor: William J. Greenhoe, Ovid, MI (US)

(73) Assignee: Pan's Innovative Science and Technology, LLC, Grand Rapids, MI (US)

( * ) Notice: Subject to any disclaimer, the term of this patent is extended or adjusted under 35 U.S.C. 154(b) by 214 days.

(21) Appl. No.: 12/027,507

(22) Filed: Feb. 7, 2008

(65) Prior Publication Data

US 2009/0201174 A1 Aug. 13, 2009

(51) Int. Cl.
*B60Q 7/00* (2006.01)

(52) U.S. Cl. ............ 340/908.1; 340/932.1; 340/815.76; 340/815.83

(58) Field of Classification Search .............. 340/908.1, 340/908, 932.1, 815.73, 815.76, 815.77, 340/815.83, 815.86
See application file for complete search history.

(56) References Cited

U.S. PATENT DOCUMENTS

| | | | | |
|---|---|---|---|---|
| 4,069,971 | A * | 1/1978 | Swanson | 126/595 |
| 4,751,622 | A * | 6/1988 | Williams | 362/183 |
| 5,341,082 | A * | 8/1994 | Lorenzen et al. | 320/165 |
| 5,490,045 | A * | 2/1996 | Lindner | 362/35 |
| 6,275,149 | B1 * | 8/2001 | Tung | 340/473 |
| 6,707,389 | B2 * | 3/2004 | Pederson | 340/815.45 |
| 7,142,103 | B2 * | 11/2006 | Chen et al. | 340/471 |
| 2004/0046678 | A1 * | 3/2004 | Grady, Jr. | 340/908 |
| 2007/0139166 | A1 * | 6/2007 | Abeyta | 340/286.09 |
| 2007/0189028 | A1 * | 8/2007 | Chen | 362/545 |
| 2007/0297167 | A1 * | 12/2007 | Greenhoe | 362/183 |

* cited by examiner

*Primary Examiner*—Travis R Hunnings
(74) *Attorney, Agent, or Firm*—Barnes & Thornburg LLP

(57) ABSTRACT

A warning light assembly includes a source of electrical power, an LED light source, electrical circuitry operably coupling the source of electrical power to the light source and a lens assembly. The lens assembly encloses the LED light source such that light from the source is directed outwardly from the lens assembly. The lens assembly is triangular in shape. In certain embodiments, the electrical power source includes a rechargeable battery and the assembly further comprises a solar panel operably connected to the rechargeable battery. A triangular lens assembly may be connected at a vertex to a housing which holds the electrical power source. The solar panel may be mounted on a peripheral surface of the lens assembly opposite the vertex.

18 Claims, 8 Drawing Sheets

WARNING LIGHT

TECHNICAL FIELD

The present invention relates generally to warning lights and, more specifically, to flashing warning lights of the type used in work zones and on construction sites. In certain embodiments, the invention relates to battery-powered flashing warning lights, including lights powered by rechargeable batteries.

BACKGROUND OF THE INVENTION

Warning lights are commonly mounted on barrels or other structures in work zones and on construction sites, and are used in either flashing or steady-burn mode. For example, type A flashing warning lights are used to warn motorists of upcoming work zones or road hazards. Type C steady-burn lights are used to delineate a travel lane through and around a construction area.

Battery-powered warning lights are typically powered by two 6-volt batteries. Such lights may use incandescent light bulbs or, more recently, light emitting diodes (LEDs). LEDs consume less energy than incandescent bulbs. Warning lights using LEDs may have a higher initial cost, but are advantageous due to the reduced energy consumption.

Warning lights which use LEDs and which are powered by rechargeable batteries connected to solar panels are known. Such lights are available, for example, from Interplex Solar, Inc. of New Haven, Conn.

Rechargeable batteries may be damaged by low and high discharge rates. If a battery is discharged too low, the negative electrode may be oxidized. A nickel metal hydride (NiMH) negative electrode stores hydrogen during the charging process and releases hydrogen during discharge. A nickel cadmium (NiCad) negative electrode stores cadmium when receiving a charge and releases cadmium during discharge. These storage locations within the negative electrode are called activation sites. During overdischarge, oxygen will migrate into the negative electrode and permanently occupy these activation sites lowering the negative electrode's energy storage capability.

Lenses used with current Type A warning lights are round in shape. This shape is used, at least in part, to more evenly collect and disperse light generated by an incandescent light source. Incandescent light sources emit light spherically. The best way to capture the most light from such a light source is by use of a round lens. Round lenses have continued in use even with LED light sources, notwithstanding that LED light sources emit light axially, rather than spherically.

A need exists for addressing problems associated with degradation of rechargeable batteries, particularly rechargeable batteries which are connected to solar panels or cells. A need further exists to improve the design of lenses and/or reflectors on warning lights using LEDs.

SUMMARY OF THE INVENTION

In certain embodiments, the invention comprises a warning light assembly having a source of electrical power, an LED light source, electrical circuitry operably connecting the source of electrical power to the light source and controlling the flow of electrical power to the light source, and a lens assembly. The lens assembly encloses the LED light source such that light from the light source is directed outwardly from the lens assembly. The lens assembly is triangular in shape.

Certain embodiments further comprise a housing containing the source of electrical power. In such embodiments, the lens assembly is coupled to a surface of the housing. The triangular lens assembly has a vertex which is coupled to the housing. In some embodiments, the vertex is rotatably coupled to the housing.

In at least one embodiment, the source of electric power is connected to the LED light source by an electrical circuit which includes a photo detector switch. The photo detector switch disconnects the power source from the light source when sunlight is detected, and connects the power source to the light source when sunlight is not detected.

In certain embodiments, the source of electrical power is a rechargeable battery, and the warning light assembly further comprises a solar panel operably connected to the rechargeable battery by an electric circuit. In some embodiments, the lens assembly comprises a vertex and a peripheral surface opposite the vertex. The solar panel is preferably disposed on the peripheral surface of the lens assembly. In one embodiment, the solar panel is mounted to the warning light assembly by at least one groove formed in the peripheral surface of the lens assembly.

The electric circuit which connects the solar panel to the rechargeable battery preferably comprises a photo detector circuit which connects the solar panel to the rechargeable battery when sunlight is detected, and which disconnects the solar panel from the rechargeable battery when sunlight is not detected. The photo detector circuit may comprise a photo cell input circuit, a Schmitt trigger circuit, a level shifter circuit, and a disconnect. The solar panel may be operably connected to the electrical circuitry by a releaseable connector.

In certain other embodiments, the warning light assembly of the present invention comprises a source of electrical power which includes a rechargeable battery. These embodiments further comprise a solar panel, an LED light source, and electrical circuitry operably connecting at least one of the source of electrical power and the solar panel to the LED light source. The electrical circuit includes a photo detector circuit for connecting the solar panel to the rechargeable battery and the LED light source when sunlight is detected, and for disconnecting the solar panel from the rechargeable battery when sunlight is not detected. In some embodiments, the photo detector circuit may comprise a photo cell input circuit, a Schmitt trigger circuit, a level shifter circuit, and a disconnect. Certain embodiments may further comprise a lens assembly which encloses the LED light source such that light from the light source is directed outwardly from the lens assembly. The lens assembly is preferably triangular in shape.

These and other embodiments further comprise a housing containing the source of electrical power. In such embodiments, the lens assembly is coupled to the surface of the housing. In certain embodiments, a vertex of the triangular-shaped lens assembly is coupled to the housing. In a preferred embodiment, the vertex is rotatably coupled to the housing.

The triangular-shaped lens assembly further comprises a peripheral surface opposite said vertex. The solar panel is disposed on the peripheral surface. In certain embodiments, the solar panel is mounted to the warning light assembly by at least one groove in the peripheral surface of the lens assembly.

Additional embodiments, features and advantages will become apparent to those skilled in the art upon consideration of the following description of the illustrated embodiments exemplifying the best mode of carrying out the invention.

BRIEF DESCRIPTION OF DRAWINGS

Embodiments will be described hereafter with reference to the attached drawings which are given as non-limiting examples only, in which.

DETAILED DESCRIPTION OF THE DRAWINGS

Figure 2:
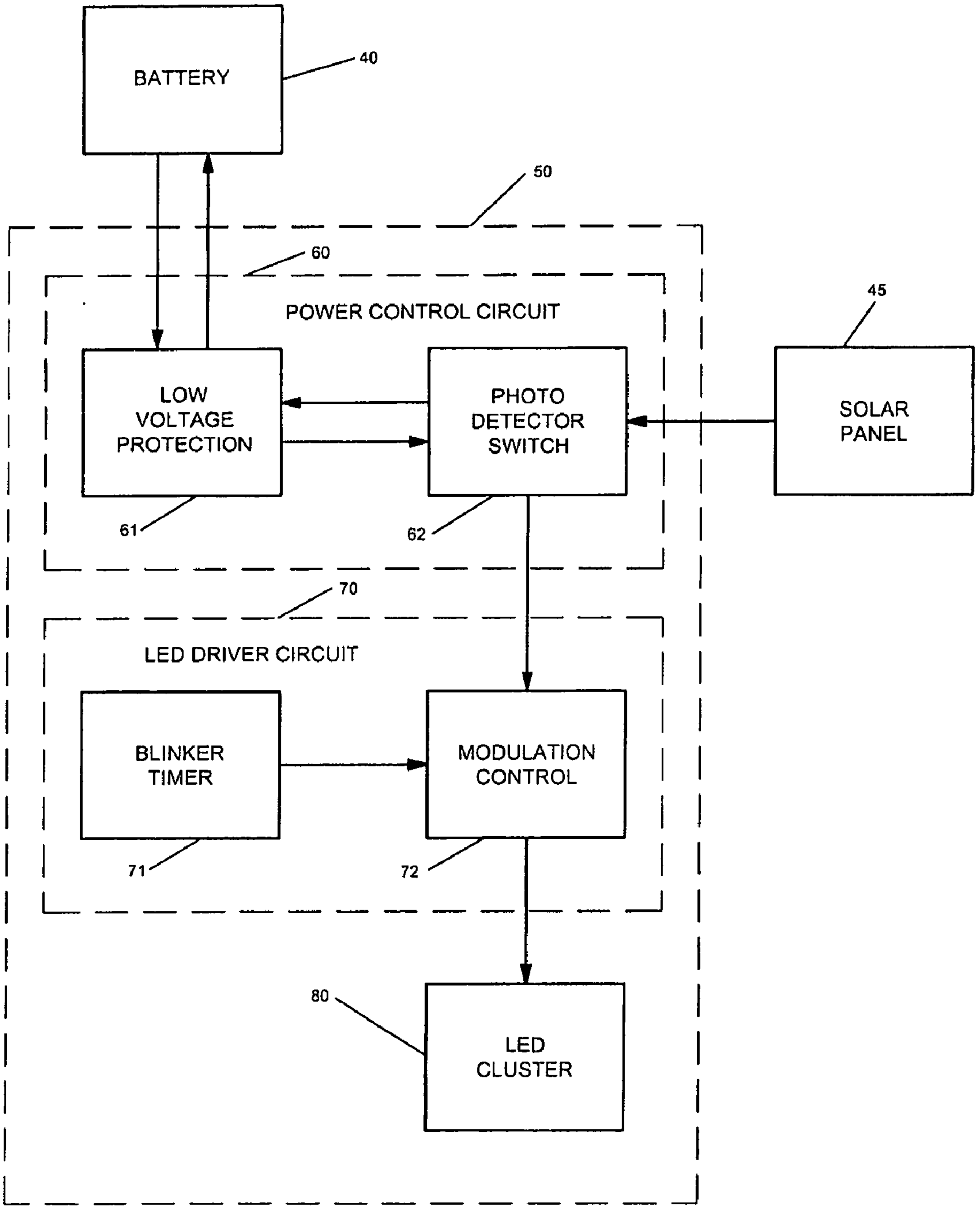
FIG. 2 is a block diagram of the rechargeable flashing warning light of FIG. 1.

A rechargeable flashing warning light constructed in accordance with one embodiment of the invention is illustrated in the drawings and generally designated 1. With reference to FIG. 2, the system includes a battery 40 connected to a low voltage protection circuit 61. Low voltage protection circuit 61 prevents battery 40 from being discharged below an unacceptably low voltage. Low voltage protection circuit 61 is connected to photo detector switch 62 in power control circuit 60. Photo detector switch 62 connects battery 40 to solar panel 45 and disconnects battery 40 from LED driver circuit 70 when photo detector switch 62 detects sunlight. This allows battery 40 to charge via solar panel 45 and turns off LED cluster 80. When photo detector switch 62 does not detect sunlight, battery 40 is disconnected from solar panel 45 and battery 40 is connected to lead driver circuit 70. Disconnecting battery 40 from solar panel 45 prevents battery 40 from discharging through solar panel 45. Connecting battery 40 to led driver circuit 70 powers modulation control 72. Modulation control 72 modulates power to LED cluster 80 to produce consistent light output during the entire discharge profile of battery 40. Blinker timer 71 turns on and off modulation control 72 to make LED cluster 80 flash at a desired frequency and duty cycle.

Figure 1:
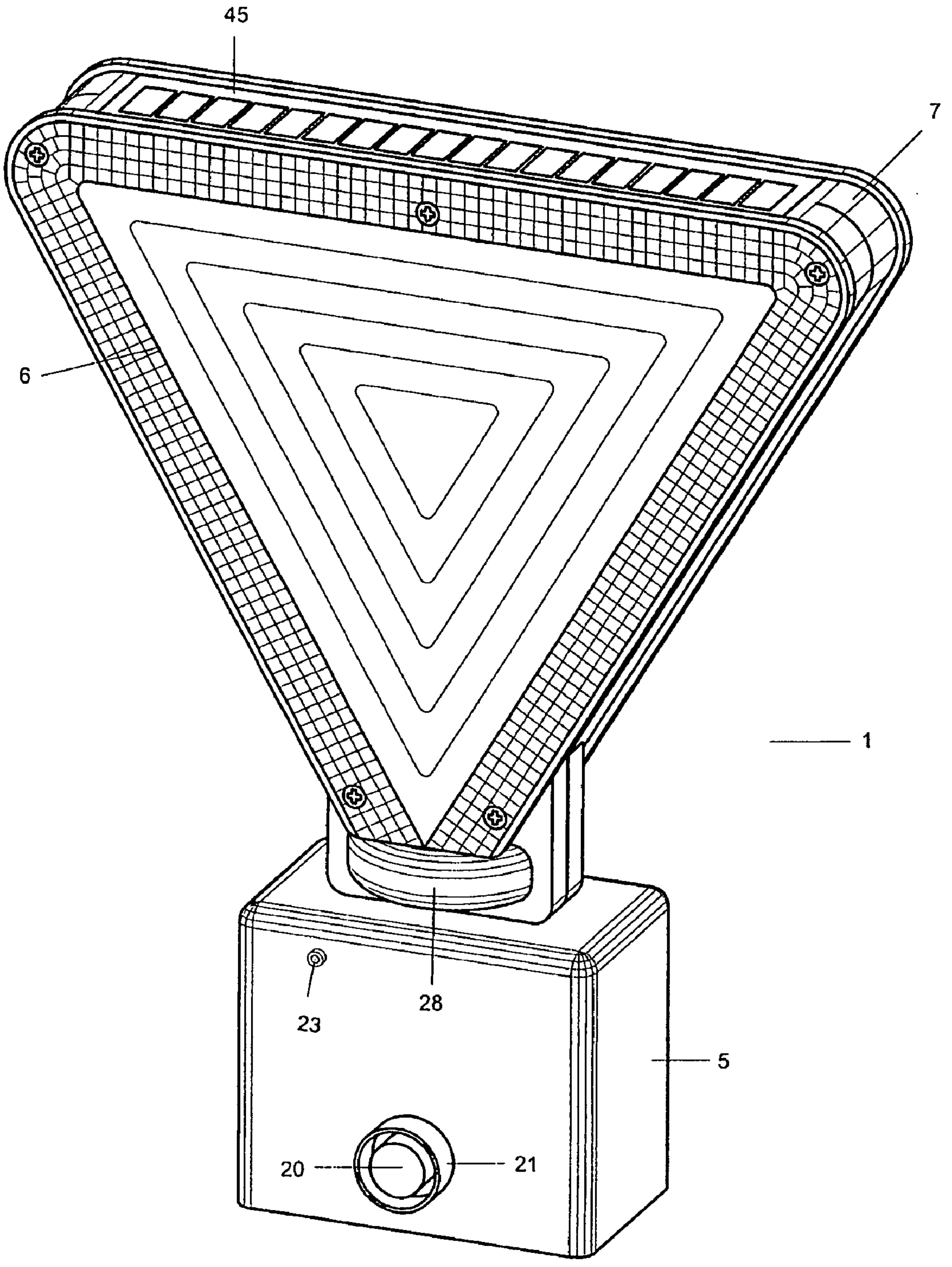
FIG. 1 is a perspective view of an illustrative embodiment of a rechargeable flashing warning light.
Figure 3:
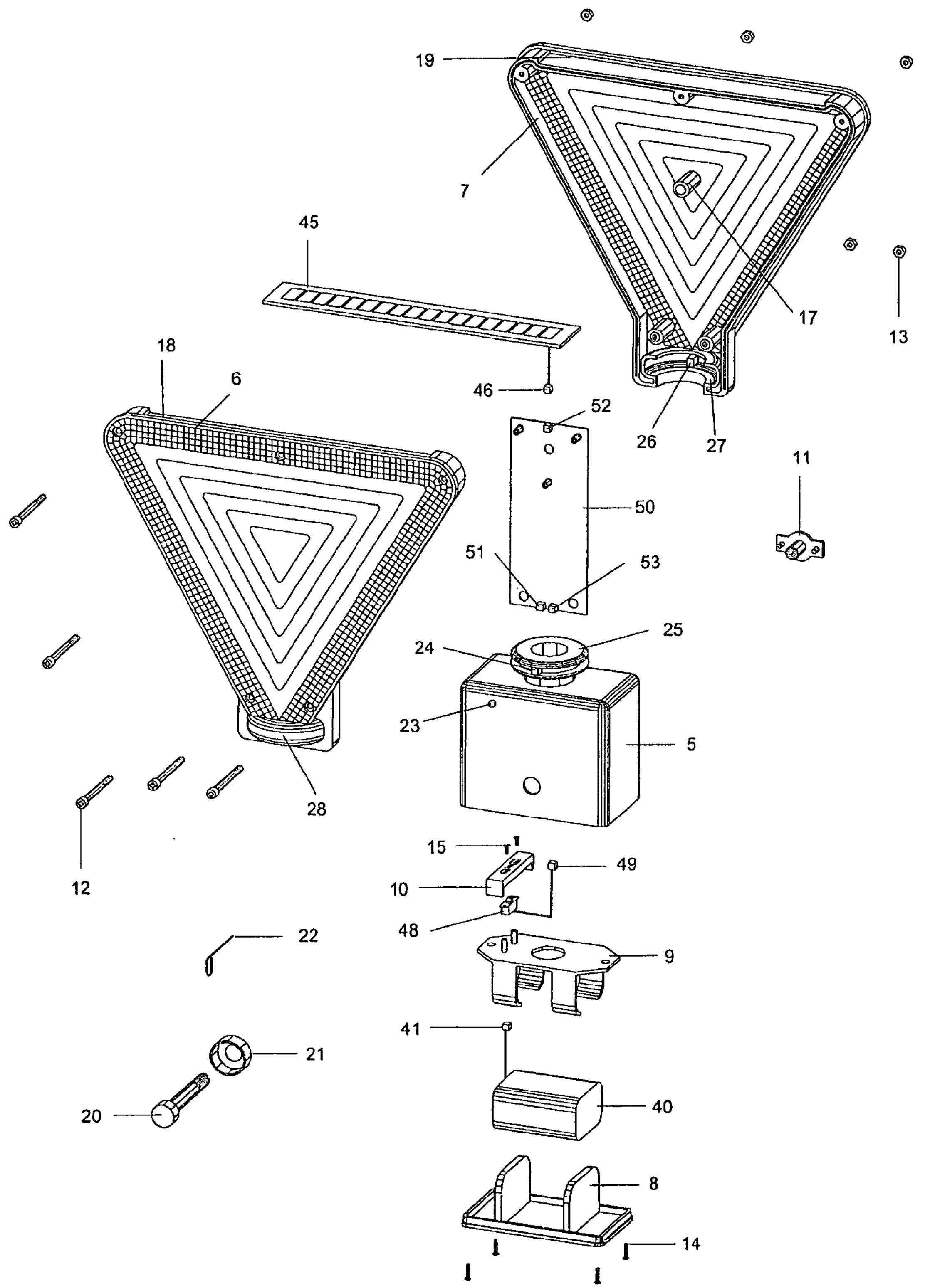
FIG. 3 is a perspective exploded view of the rechargeable flashing warning light of FIG. 1.

With reference to FIGS. 1 and 3, housing 5 is hi-impact polypropylene, in a rectangular box shape. Included in housing 5 is a rotator ring 25 with stop 24. Rotator ring 25 is cylindrical in shape. Rotator ring 25 sits above the rectangular box shape. On the backside of housing 5, tamper resistant nut 11 is mounted via compression.

Lens 6 is Lexan (polypropylene). It is substantially transparent, amber (orange) in color, and has a triangular shape. At the base of lens 6 is rotator cup 28. Rotator cup 28 mates with rotator ring 25 of housing 5.

Lens 7 is Lexan (polypropylene). It is substantially transparent, amber (orange) in color, and has a triangular shape. At the base of lens 7 is rotator cup 27. Rotator cup 27 mates with rotator ring 25 of housing 5. Also inside rotator cup 27 is stop 26.

Lenses 6 and 7 are mounted to flashing warning light 1 by mating rotator cups 28 of lens 6 and rotator cup 27 of lens 7 with rotator ring 25 of housing 5. Nuts 13 (×5) fit into hex shaped cavities on the backside of lens 7. Bolts 12 (×5) and nuts 13 (×5) hold lens 6 and lens 7 to housing 5. Lens 6 and lens 7 rotate 340° around housing 5. Stop 26 of lens 7 and stop 24 of housing 5 prevent lens 6 and lens 7 from rotating further and damaging wires.

Circuit board 50 is mounted to flashing warning light 1 by sandwiching it between lens 6 and lens 7 with two bolts 12 and nuts 13 going through circuit board 50. The top of circuit board 50 is supported with a post on lens 6 (not shown) and a post 17 on lens 7.

Solar panel 45 can be any solar panel. In one embodiment, solar panel 45 is monocrystalline. Solar panel 45 is mounted to flashing warning light 1 by grooves 18 and 19 in lens 6 and lens 7, respectively, and is held in place by compression. Connector 46 of solar panel 45 provides a means for releasable interconnection with connector 52 of circuit board 50.

Battery holder 9 is polypropylene. There are four polypropylene battery straps on the bottom of battery holder 9 to hold battery 40 in place and two cylindrical posts on top to hold switch 48.

Battery holder 9 houses battery 40 and switch 48. Battery 40 can be any rechargeable battery. In one embodiment, battery 40 is a 6-cell, 7.2 Volt, 3.5 Ahr. nickel-metal hydride (NiMH) battery. Battery 40 includes a connector 41. Switch 48 is a SPST switch that is mounted to battery holder 9 via the two cylindrical posts. Switch 48 includes a connector 49. Switch slide 10 is polypropylene. Switch slide 10 has two grooves for the heads of screws 15 (×2) to sit in and two holes for the shafts of screws 15 (×2). Switch 48 sits on top of the two cylindrical posts of battery holder 9. Switch slide 10 sits on top of switch 48. Screws 15 (×2) attach switch 48 and switch slide 10 to battery holder 9. Switch slide 10 slides back and fourth turning on and off switch 48. Battery holder 9 with battery 40 and switch 48 attaches to housing 5 via two clips inside housing 5 that mate with two holes in battery holder 9.

Base 8 is hi-impact polypropylene. There are two battery holder posts. Base 8 is mounted to housing 5 with screws 14 (×4). The battery holder posts rest up against the four battery straps of battery holder 9 to prevent the battery from moving.

Flashing warning light 1 can be mounted to a barrel or barricade via bolt 20 and tamper resistant nut 11 mounted in housing 5. Bolt protector 21 prevents un-authorized persons from removing bolt 20 and/or flashing warning light 1.

Switch pin 22 turns on and off flashing warning light 1. Inserting switch pin 22 into switch hole 23 of housing 5 allows switch pin 22 to push switch slide 10 and thus switch 48 to the on position. Inserting switch pin 22 into a switch hole on the back side of housing 5 allows switch pin 22 to push switch slide 10 and thus switch 48 to the off position.

Lens 6 and lens 7 house circuit board 50. Circuit board 50 consists of power control circuit 60, LED driver circuit 70, and LED cluster 80, schematically shown in FIG. 4, interfaces with battery 40, solar panel 45, and switch 48. Connector 41 of battery 40 provides a means for interconnection with battery connector 51 of circuit board 50. Connector 49 of switch 48 provides a means for interconnection with switch connector 53 of circuit board 50. Within circuit board 50, terminal 58 of switch 48 is connected to the positive side 54 of battery connector 51.

Figure 4:
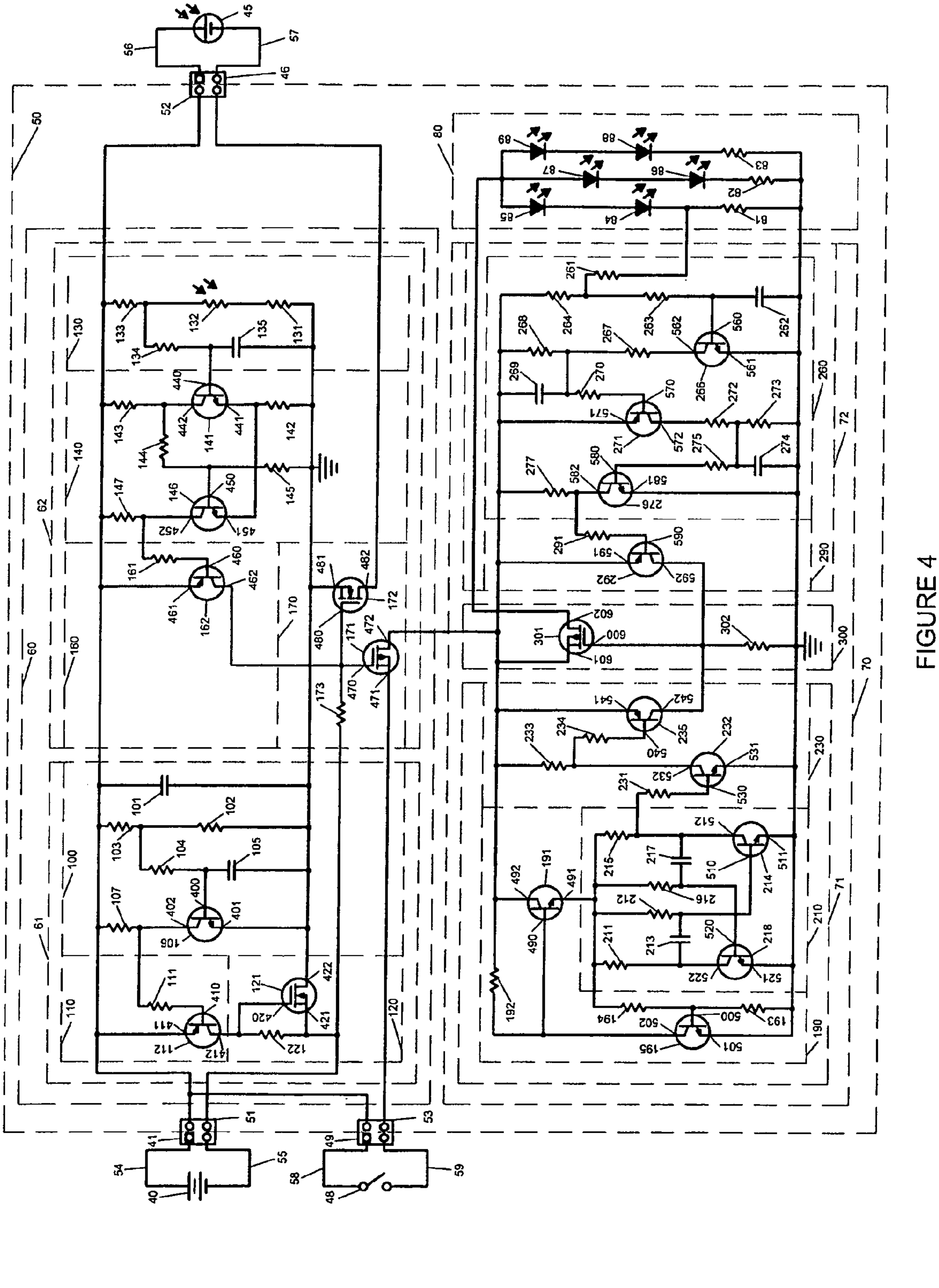
FIG. 4 is a schematic circuit diagram of the rechargeable flashing warning light of FIG. 1.

With reference to FIG. 4, power control circuit 60 can be divided into two functional parts; low voltage protection circuit 61, and photo detector switch 62. Low voltage protection circuit 61, of power control circuit 60, can be further divided into three functional parts; shutdown 100, level shifter 110, and disconnect 120. Low voltage protection circuit 61 of power control circuit 60 allows battery 40 to discharge until the battery reaches 5% state of charge (SOC) or 95% depth of discharge (DOD), at which power control circuit 60 terminates the power to LED cluster 80 to prevent battery 40 from degrading.

Shutdown 100 controls when power output is terminated. Shutdown 100 contains a 24.9 kΩ resistor 102 in series with a 280 kΩ resistor 103. The level of resistance in these two resistors determines at what voltage power output is terminated. Resistors 102 and 103 comprise a voltage divider configuration. The values of the resistors will be selected depending on the desired cut-off voltage. A 0.1 μF capacitor 101 connected in parallel with the voltage divider resistors 102 and 103. Interconnected between resistors 102 and 103 is a 100 kΩ resistor 104 leading to base terminal 400 of NPN transistor 106. Emitter terminal 401 of transistor 106 is connected to drain 422 on disconnect 120 transistor 121. The disconnect 120 transistor 121 is a metal-oxide semiconductor field-effect transistor (MOSFET). A 0.1 μF capacitor 105 connected in parallel between the base terminal 400 of transistor 106 and drain 422 on disconnect 120 MOSFET 121. A 750 kΩ resistor 107 is connected between the collector terminal 402 of transistor 106 and positive side 54 of battery 40. Shutdown 100 controls the level shifter 110.

Level shifter 110 connects with shutdown 100 by a 100 kΩ resistor 111 to collector terminal 402 of shutdown 100 transistor 106 and base terminal 410 of PNP transistor 112. Emitter 411 of transistor 112 is connected to positive side 54 of battery 40. Level shifter 110 is controlled by shutdown 100, and in turn level shifter 110 controls disconnect 120.

Disconnect 120 connects with level shifter 110 at collector 412 of level shifter 110 transistor 112 and gate 420 of MOSFET 121. A 150 kΩ resistor 122 is connected in parallel between gate 420 and source 421 of MOSFET 121. The source 421 of MOSFET 121 is connected to negative side 55 of battery 40.

Photo detector switch circuit 62 of power control circuit 60 can be divided into four functional parts; photocell input circuit 130, Schmitt trigger circuit 140, level shifter circuit 160, and disconnects 170. The photo detector switch circuit 62 of power control circuit 60 connects solar panel 45 to battery 40 and disconnects LED driver circuit 70 from battery 40 when photocell 132 detects sunlight. When photocell 132 does not detect sunlight, photo detector switch circuit 62 of power control circuit 60 disconnects solar panel 45 from battery 40 and connects LED driver circuit 70 to battery 40.

Photocell input circuit 130 controls when battery 40 is switched between solar panel 45 and LED driver circuit 70. Photocell input circuit 130 contains a 1.0 kΩ resistor 131 in series with a 20 kΩ photoconductive cell 132 and a 475 kΩ resistor 133. Resistor 131 and photoconductive cell 132 comprise a voltage divider with resistor 133 and the resistance of resistor 131 and photoconductive cell 132 determines at what voltage switching occurs. The values of resistors 131 and 133 will be selected depending on the desired switching light. Interconnected between photoconductive cell 132 and resistor 133 is a 1.0 MΩ resistor 134 leading to base terminal 440 of NPN Schmitt trigger 140 transistor 141. A 0.1 μF capacitor 135 connected between resistor 134 and drain 422 on disconnect 110 MOSFET 121.

Schmitt trigger circuit 140 lowers the switching threshold base terminal 440 of NPN transistor 141 after transistor 141 is switched ON and raises the switching threshold after transistor 141 is switched OFF preventing power to the LED driver circuit from oscillating ON and OFF. Schmitt trigger circuit 140 consists of a 68.1 kΩ resistor 142 connected between emitter 441 of transistor 141 and drain 422 on disconnect 120 MOSFET 121. Between collector 442 of transistor 141 and positive 54 of battery 40 is a 475 kΩ resistor 143. A 768 kΩ resistor provides negative feedback between collector 442 of transistor 141 to base 450 of NPN transistor 146. Base 450 of transistor 146 is also connected to a 309 kΩ resistor 145 with the other end of resistor 145 connected to drain 422 on disconnect 120 MOSFET 121. Emitter 451 of transistor 146 is connected to emitter 441 of transistor 141. A 221 kΩ resistor 147 is connected between positive side 54 of battery 40 and collector 452 of transistor 146.

Level shifter 160 connects with Schmitt trigger circuit 140 by a 1.0 MΩ resistor 161 to collector terminal 452 of Schmitt trigger circuit 140 transistor 146 and base terminal 460 of PNP transistor 162. Emitter 461 of transistor 162 is connected to the positive side 54 of battery 40. Level shifter 160 is controlled by Schmitt trigger 140 and in turn level shifter 160 controls disconnects 170.

Disconnects 170 connect with level shifter 160 at collector 462 of level shifter 160 transistor 162 and gate 470 of PNP MOSFET 171 and to gate 480 of NPN MOSFET 172. A 150 kΩ resistor 173 is connected to both gate 470 of MOSFET 171 and gate 480 of MOSFET 172. The other end of resistor 173 is connected to negative side 55 of battery 40. Source 471 of MOSFET 171 is connected to terminal 52 of switch 48. Drain 472 of MOSFET 171 is connected to source 601 of switch 300 MOSFET 301 of LED driver circuit 70. Source 481 of MOSFET 172 is connected to drain 422 of disconnect 120 MOSFET 121. Negative side 57 of solar panel 45 is connected to drain 482 of MOSFET 172.

LED driver circuit 70 can also be divided into three functional parts; timer circuit 71, modulation control 72, and switch 300. LED driver circuit 70 modulates the LEDs to produce a consistent light output (5000-5500 Lux) during the entire discharge profile of the battery and blink every second with a 10 percent duty cycle.

Timer circuit 71 of LED driver circuit 70 can be divided into three sections: voltage control 190, bistable multi-vibrator 210, and level shifter 230. Voltage control 190 maintains a stable voltage on the positive side of the bistable multi-vibrator 210 during the entire discharge of battery 40. Voltage control 190 consists of a 39 KΩ resistor 193 and a 240 kΩ resistor 194 in a voltage divider configuration. Resistor 193 is also connected to drain 442 of disconnect 120 MOSFET 121 with the other end of resistor 194 connected to the positive side of bistable multi-vibrator 210. In the middle of resistors 193 and 194 voltage divider is base 500 of NPN transistor 195. Emitter 501 of transistor 195 is connected to drain 422 of disconnect 120 MOSFET 121. Collector 502 of transistor 195 is connected to base 490 of NPN transistor 191. Across base 490 and collector 492 of transistor 191 is a 150 kΩ resistor 192. Collector 492 of transistor 191 is connected to drain 472 of disconnects 170 MOSFET 171. The output of the voltage control 190 is emitter 491 of transistor 191, which is connected to the positive side of the bistable multi-vibrator.

Bistable multi-vibrator 210 generates an output to level shifter 230 with a constant frequency and duty-cycle. A 150 kΩ resistor 211 is connected between emitter 491 of voltage control 190 transistor 191 and collector 522 of NPN transistor 218. Emitter 521 of transistor 218 is connected to drain 422 of disconnect 120 MOSFET 121. Between collector 522 of transistor 218 and base 510 of NPN transistor 214 is a 0.1 μF capacitor 213. Also connected to base 510 of transistor 214 is a 13 MΩ resistor 212 with the other end of resistor 212 connected to the emitter 491 of voltage control 190 transistor 191. A 150 kΩ resistor 215 is connected between emitter 491 of voltage control 190 transistor 191 and collector 512 of transistor 214. Emitter 511 of transistor 214 is connected to drain 422 of disconnect 120 MOSFET 121. Between collector 512 of transistor 214 and base 520 of transistor 218 is a 0.1 μF capacitor 217. Also connected to base 520 of transistor 218 is a 6.2 MΩ resistor 216 with the other end of resistor 216 connected to the emitter 491 of voltage control 190 transistor 191.

Level shifter 230 is connected to bistable multi-vibrator 210 by a 22 kΩ resistor 231 between collector 512 of bistable multi-vibrator 210 transistor 214 and base 530 of NPN transistor 232. Emitter 531 of transistor 232 is connected to drain 422 of disconnect 120 MOSFET 121. A 150 kΩ resistor 233 is connected between the drain 472 of disconnects 170 MOSFET 171 and collector 532 of transistor 232. Collector 532 of transistor 232 is also connected to base 540 of PNP transistor 235 by a 22 kΩ resistor 234. Emitter 541 of transistor 235 is connected to the drain 472 of disconnects 170 MOSFET 171. The output of the level shifter 230 is collector 542 of transistor 235, which is connected to the gate 600 of switch 300 MOSFET 301.

Modulation control 70 adjusts the rate of modulation of LED cluster 80 based on the voltage of battery 40. Modulation control 70 can be divided into two functional parts; modulation 260 and level shifter 290. Modulation 260 is connected to LED cluster 80 with a 14.3Ω resistor 81 connected in series with a 10.0 kΩ resistor 261 and an 232 KΩ resistor 264. Interconnected between resistors 261 and 264 is a 2.2 kΩ resistor 263 leading to base terminal 560 of NPN transistor 266. Emitter terminal 561 of transistor 266 is connected to drain 422 on disconnect 120 MOSFET 121. A 0.1 μF capacitor 262 connected in parallel between base 560 of transistor 266 and drain 422 on disconnect 120 MOSFET 121. A 56.2 kΩ resistor 267 is connected between collector 562 of transistor 266 and a 7.5 kΩ resistor 268. The other end of resistor 268 is connected to drain 472 of disconnects 170 MOSFET 171. In parallel with resistor 268 is a 47 nF capacitor 269. Interconnected between resistors 267 and 268 is a 2.2 kΩ resistor 270 leading to base 570 of PNP transistor 271. Emitter 571 of transistor 271 is connected to drain 472 of disconnect 170 MOSFET 171. Connected to collector 572 of transistor 271 are a 17.8 kΩ resistor 272 and a 2.37 kΩ resistor 273 connected in series. The other end of resistor 273 is connected to drain 422 of disconnect 120 MOSFET 121. In parallel with resistor 273 is a 47 nF capacitor 274. Interconnected between resistors 272 and 273 is a 2.2 kΩ resistor 275 leading to base 580 of NPN transistor 276. Emitter 581 of transistor 276 is connected to drain 422 on disconnect 120 MOSFET 121. A 100 kΩ resistor 277 is connected between collector 582 of transistor 276 and drain 472 of disconnects 170 MOSFET 171.

Level shifter 290 is connected to modulation 260 by a 22 kΩ resistor 291 connected between collector 582 of modulation 260 transistor 276 and base 590 of PNP transistor 292. Emitter 591 of transistor 292 is connected to drain 472 of disconnects 170 MOSFET 171. The output of the shifter 290 is collector 592 of transistor 292, which is connected to the gate 600 of switch 300 MOSFET 301.

Switch 300 is connected to both level shifter 230 and level shifter 290 at gate 600 of PNP MOSFET 301. A 22 kΩ resistor 302 is connected between the gate 600 of MOSFET 301 and drain 422 of disconnect 120 MOSFET 121. Source 601 of MOSFET 301 is connected to drain 472 of disconnects 170 MOSFET 171. The output of switch 300 is the drain 602 of MOSFET 301, which is connected to the anode of LED cluster 80.

LED cluster 80 can consist of multiple LEDs connected in series with a resistor with multiple strings of LEDs and resistors connected in parallel. In one embodiment, there are two LEDs 84 and 85 connected in series with the cathode of LED 84 connected between resistor 81 and resistor 261 of modulation 260. The anode of LED 85 is connected to the drain 602 of switch 300 MOSFET 301. There are two more strings of two LEDs (86-89) and resistors (82-83) connected in series between drain 602 of switch 300 MOSFET 301 and drain 422 on disconnect 120 MOSFET 121.

Operation

When battery 40 is charged, the low voltage protection circuit 61 allows power to photo detector switch 62. Low voltage protection circuit 61 allows battery 40 to discharge until the battery reaches 5% state of charge (SOC) or 95% depth of discharge (DOD). Output low voltage protection circuit 61 terminates the power to the photo detector switch and LED cluster 80 to prevent battery 40 from degrading.

Specifically, the power termination occurs when base 400 of transistor 106 receives about 0.65 V or less. This specified level is determined by the voltage divider of resistor 102 and resistor 103 in parallel with battery 40. At this level transistor 106 no longer allows current to flow from collector 402 to emitter 401 on transistor 106. The lack of power flowing through transistor 106 changes the voltage at its collector 402 from zero to a positive charge. This change of charge at collector 402 on transistor 106 activates base 410 of transistor 212. Before base 410 of transistor 212 is activated, transistor 112 allows current to flow from emitter 411 to collector 412 keeping a positive charge to gate 420 of MOSFET 121. A positive charge at gate 420 allows current to flow from source 421 to the drain 422 of MOSFET 121 supplying power to photo detector circuit 61 and LED cluster 80. The lack of power flowing into collector 411 of transistor 112 changes the voltage at gate 420 of MOSFET 121 to zero. When gate 420 of MOSFET 121 has no voltage, the MOSFET is switched, terminating power to photo detector circuit 62 and LED cluster 80. Also, changing gate 420 voltage to zero changes drain 422 of MOSFET 121 voltage from zero to a positive charge. A positive charge at drain 422 of MOSFET 121 causes the voltage divider of resistor 102 and resistor 103 to level shift to a positive charge and disconnects the voltage divider from battery 40. When photo detector circuit 62 and LED cluster 80 are disconnected from battery 40, the voltage across battery 40 increases. With the voltage divider of resistor 102 and resistor 103 disconnected from battery 40, the low voltage protection circuit 61 keeps the power disconnected from photo detector circuit 62 and LED cluster 80 until low voltage protection circuit 61 is reset. In this design (6-cells), the voltage divider is set to disconnect the battery at 5.8 volts.

Resetting low voltage protection circuit 61 is accomplished by power from solar panel 45. Power from solar panel 45 across the voltage divider of resistor 102 and 103 applies a voltage at base 400 of transistor 106 above 0.65 V. This voltage at base 400 allows current to flow from collector 402 to emitter 401 of transistor 106. Having power flow through transistor 106 changes its collector 402 voltage from a positive charge to zero. This change in charge at collector 402 of transistor 106 lowers the voltage at base 410 of transistor 112. Lowering the voltage at base 410 allows current to flow from emitter 411 to collector 412 of transistor 112 changing the voltage at collector 412 from zero to a positive charge. A positive charge on collector 412 of transistor 112 applies a positive charge to gate 420 of MOSFET 121. A positive charge at gate 420 allows current to flow from source 421 to the drain 422 of MOSFET 121 to recharge battery 40.

The photo detector switch 62 works when the sun lowers the resistance across photoconductive cell 132 causing the voltage at base 440 of transistor 141 to lower. A low voltage at base 440 of transistor 141 prevents current from flowing from its collector 442 to emitter 441. No current flowing through transistor 141 sets the base 450 of transistor 146 by the voltage divider of resistor 145 with resistors 144 and 143. This voltage divider gives a high voltage at base 450 of transistor 146 allowing current to flow from its collector 452 to emitter 451 lowering collector 452 voltage. A low voltage on collector 452 of transistor 146 applies a low voltage at the base 460 of transistor 162. A low voltage at base 460 of transistor 162 allows current to flow from its emitter 461 to collector 162 giving collector 462 a positive charge. A positive charge at collector 462 of transistor 162 places a positive charge on both gate 470 of MOSFET 171 and gate 480 of MOSFET 172. A positive charge on gate 470 of MOSFET 171 prevents current from flowing through from its source 471 to drain 472, which disconnects power to the LED driver circuit 70. A positive charge on gate 480 of MOSFET 172 allows current to flow from its source 481 to drain 482, which allows solar panel 45 to charge battery 40.

As the sunlight diminishes, the resistance across the photoconductive cell 132 increases. An increased resistance on photoconductive cell 132 increases the voltage on base 440 of transistor 141. As the voltage increases on base 440 of transistor 141 to the voltage set by the resistor 145 and resistors 143 and 144 voltage divider, transistor 141 starts to conduct current from its collector 442 to emitter 441 lowering collector 442 voltage. A low voltage on collector 442 of transistor 141 lowers the voltage on base 450 of transistor 146. Lowering base 450 of transistor 146 disconnects current flow from its collector 452 to emitter 451 giving collector 452 a positive charge. A positive on collector 452 of transistor 146 applies a positive charge at base 460 of transistor 162. A positive charge at base 460 of transistor 162 disconnects current to flow from its emitter 461 to collector 162 giving collector 462 a zero charge. A zero charge at collector 462 of transistor 162 places a zero charge on both gate 470 of MOSFET 171 and gate 480 of MOSFET 172. A zero charge on gate 470 of MOSFET 171 allows current to flow through from its source 471 to drain 472, which connects power to the LED driver circuit 70. A zero charge on gate 480 of MOSFET 172 disconnects current flow from its source 481 to drain 482, which prevents battery 40 from discharging through solar panel 45.

When the sun is out and transistor 141 is not conducting current, the threshold at which voltage base 440 of transistor 141 needs to switch states is established by the voltage divider of resistor 145 and resistors 143 and 143. Emitter voltages of both emitter 441 of transistor 141 and emitter 451 of transistor 146 are about 0.6 volts below the threshold voltage of the voltage divider. As the sunlight diminishes and the resistance across the photoconductive cell 132 increases, transistor 141 starts to conduct. This causes the voltage to lower for both emitter 441 of transistor 141 and emitter 451 of transistor 146. Lowering the voltage at both emitters in the Schmitt trigger 140 lowers the threshold voltage base 440 of transistor 141 needs to switch back. This prevents the photo detector circuit 62 from oscillating between states.

When switch 48 is closed and MOSFET 171 starts conducting current, power is supplied to LED driver circuit 70. All of the nodes within LED driver circuit 70 would be at a zero potential until MOSFET 171 starts conducting. Blinking timer 71 starts working when both collector 492 and base 490 of transistor 191 of voltage control circuit 190 rise to a positive charge. A positive charge between base 490 and emitter 491 of transistor 191 will allow current to flow through its collector 492 to emitter 491 to resistors 194 and 193. This current will increase until the voltage across resistor 193 raises the voltage at base 500 of transistor 195 and transistor 195 starts to conduct current through its collector 502 to emitter 501. As transistor 195 starts to conduct, the voltage on collector 502 of transistor 195 will lower. Collector 502 of transistor 195 will lower base 490 of transistor 191 until transistor 191 is conducting enough current to maintain about 0.6 volts across resistor 193 and base 500 of transistor 195. With the selection of resistor values of resistors 193 and 194, voltage control circuit 190 will maintain about 4.0 volts to the positive side of bistable multi-vibrator circuit 210 for the entire discharge profile of battery 40.

Within bistable multi-vibrator circuit 210, when the voltage at base 520 of transistor 218 is high, the voltage at its collector 522 will be low. A low voltage at collector 522 of transistor 218 will provide a low voltage on capacitor 213 and base 510 of transistor 214. Collector 512 of transistor 214 will have a high output voltage to level shifter 230 due to its low base 510 voltage. Capacitor 213 will start to charge through resistor 212 causing base 510 voltage to rise based on the capacitor 213 to resistor 212 time constant. When base 510 of transistor 214 reaches about 0.6 volts, its collector 512 to emitter 511 junction will start to conduct, switching its output voltage level to level shifter 230 from high to low. Capacitor 217 will discharge through collector 512 to emitter 511 junction of transistor 214. Lowering the voltage at collector 512 of transistor 214 and lowering the voltage on capacitor 217 will lower the voltage at base 520 of transistor 218. Lowering the voltage at base 520 of transistor 218 will cause its collector 522 to emitter 521 junction to stop conducting, switching its collector 522 voltage level from low to high. Capacitor 217 will start to charge through resistor 216 causing base 520 of transistor 218 voltage to rise again, based on the capacitor 217 to resistor 216 time constant. When the base 520 of transistor 218 reaches about 0.6 volts, its collector 522 to emitter 521 junction will start to conduct again, switching its collector 522 voltage from high to low. Capacitor 213 will discharge through collector 522 of transistor 218 and lowering the voltage on capacitor 213 will lower the voltage at base 510 of transistor 214. Lowering the voltage at base 510 of transistor 214 will cause its collector 512 to emitter 511 junction to stop conduction, switching its output voltage at level shifter 230 from low to high. This bistable multi-vibrator circuit 210 will constantly modulate its output to the level shifter 230 with a constant frequency and duty-cycle base on the time constants of resistor 212-capacitor 213 and resistor 216-capacitor 217.

When the bistable multi-vibrator circuit 210 has a low output to level shifter 230, resistor 231 supplies a low voltage to base 530 of transistor 232. A low voltage to base 530 of transistor 232 prevents transistor 232 from conducting current from its collector 532 to emitter 531. No current through transistor 232 gives a positive voltage at its collector 532 and to base 540 of transistor 235 via resistor 234. A high voltage at base 540 of transistor 235 prevents transistor 235 from conducting current from its emitter 541 to collector 542 giving the output of level shifter 230 and the input to switch 300 a low voltage. A low voltage to the input of switch 300 supplies a low voltage to gate 600 of switch 300 MOSFET 301. This allows current to flow through source 601 to drain 602 of MOSFET 301 supplying power to LED cluster 80 and turning on LEDs 84-89.

As the output of bistable multi-vibrator circuit 210 switches its output from low to high, resistor 231 raises the voltage at base 530 of transistor 232. Transistor 232 starts conducting current from its collector 532 to emitter 531. Current through transistor 232 and through resistor 233 lowers the voltage at collector 532 from a positive charge to zero. Zero voltage at collector 532 of transistor 232 lowers the voltage at base 540 of transistor 235 via resistor 234. Lowering the voltage at base 540 allows transistor 235 to start conducting current through resistor 302 of switch 300. The current through resistor 302 of switch 300 switches the output of level shifter and the input to switch 300 from low to high. A high voltage to the input of switch 300 supplies a high voltage to gate 600 of switch 300 MOSFET 301. This prevents current to flow through source 601 to drain 602 of MOSFET 301 removing power to LED cluster 80 and turns LEDs 84-89 off.

Also, when switch 50 is closed and MOSFET 171 starts conducting current, power is supplied to LED cluster 80 and modulation 260 of LED driver circuit 70. When the blinker timer 71 has a low output to switch 300, this causes current to flow through LEDs 84-88 turning on the LED cluster. Current flowing through LED 84, LED 85, and resistor 81 raises the voltage on resistor 261 of modulation 260. Increasing the voltage on resistor 261 raises the voltage at base 560 of transistor 266 allowing current flow from collector 562 to emitter 561 and through resistors 267-268. This lowers the voltage at collector 562 of transistor 266. As the voltage at collector 562 of transistor 266 lowers, capacitor 269 charges lowering the voltage at base 570 of transistor 271 via resistor 270. As the voltage across capacitor 269 and resistor 268 decreases by about 0.6 volts, base 570 to emitter 571 voltage increases allowing current flow from its emitter 571 to collector 572 and through resistors 272-273. This current charges capacitor 274 increases the voltage at base 580 of transistor 276 via resistor 275. As the voltage across capacitor 274 and resistor 273 increasing to about 0.6 volts, base 580 of transistor 276 starts allowing current flow from collector 582 to emitter 581 and through resistor 277. Current through resistor 277 lowers the voltage at base 590 of shifter 290 transistor 292. Lowering the voltage at base 590 allows current flow from emitter 591 to collector 592 of transistor 292 changing the voltage at its collector 592 from zero to a positive charge. A positive charge on collector 592 of transistor 292 applies a positive charge to gate 600 of switch 300 of MOSFET 301. A positive charge at gate 600 of MOSFET disconnects current flow from source 601 to drain 602 of MOSFET 301 turning off LED cluster 80.

Turning off LED cluster 80 disrupts the current flowing through LED 84, LED 85, and resistor 81. No current through resistor 81 lowers the voltage on resistor 261 of modulation 260. Lowering the voltage on resistor 261 lowers the voltage at base 560 of transistor 266 preventing current flow from collector 562 to emitter 561 and resistors 267-268. With the current flow removed, capacitor 269 discharges through resistor 268. As the voltage across capacitor 269 and resistor 268 decreases, base 570 to emitter 571 voltage decreases disrupting current flow from its emitter 571 to collector 572 and through resistors 272-273. Capacitor 274 discharges through resistor 273 causes the voltage at base 580 of transistor 276 to drop. As the voltage at base 580 of transistor 276 lowers, current flow from collector 582 to emitter 581 is disrupted raising its collector 582 voltage to a positive charge. A positive charge on collector 582 of transistor 276 raises the voltage at base 590 of transistor 292 of level shifter 290 to a positive charge. A positive charge at base 590 disrupts current flow from emitter 591 to collector 592 of transistor 292 changing the voltage at its collector 592 from a positive charge to zero. A zero charge on collector 592 of transistor 292 applies a zero charge to gate 600 of switch 300 of MOSFET 301. A zero charge at gate 600 of MOSFET 301 re-establishes current flow from source 601 to drain 602 of MOSFET 301 turning LED cluster 80 back on.

When battery 40 is fully charged, modulation circuit 72 turns on and off the LED cluster 80 at a frequency and duty cycle to produce the desired light output from LED cluster 80. In one embodiment, the starting frequency is about 3k Hz with a duty cycle of about 40 percent on with a desired light output of about 5,500 Lux. As the battery voltage drops during discharge, the frequency of modulation decreases and the duty cycle increases, keeping LED cluster 80 on longer to maintain the desired light output. When the voltage on battery 40 is low enough to produce the desired light output without modulating the LED cluster 80, the frequency of modulation of the modulation 72 is zero and the LED cluster 80 is continuously on. This set point is determined by the voltage divider of resistor 264 with resistors 261 and 81 with the added voltage from the current through LEDs 85, 84 and resistor 81. In one embodiment, the voltage on battery 40 is 6.25 volts.

FIGS. 5-8 relate to an alternative embodiment of a flashing warning light. This alternative embodiment is powered by non-rechargeable batteries (e.g., alkaline batteries) and, accordingly, does not include a solar panel for recharging same. In the description which follows, corresponding reference numbers are used to identify components which may be used with either of the illustrative embodiments. The embodiment of FIGS. 5-8 may be used in various settings (including those in which the embodiment of FIGS. 1-4 may be used) but are particularly advantageous for use in areas that do not receive sunlight (e.g., tunnels, covered bridges, etc.).

Figure 5:
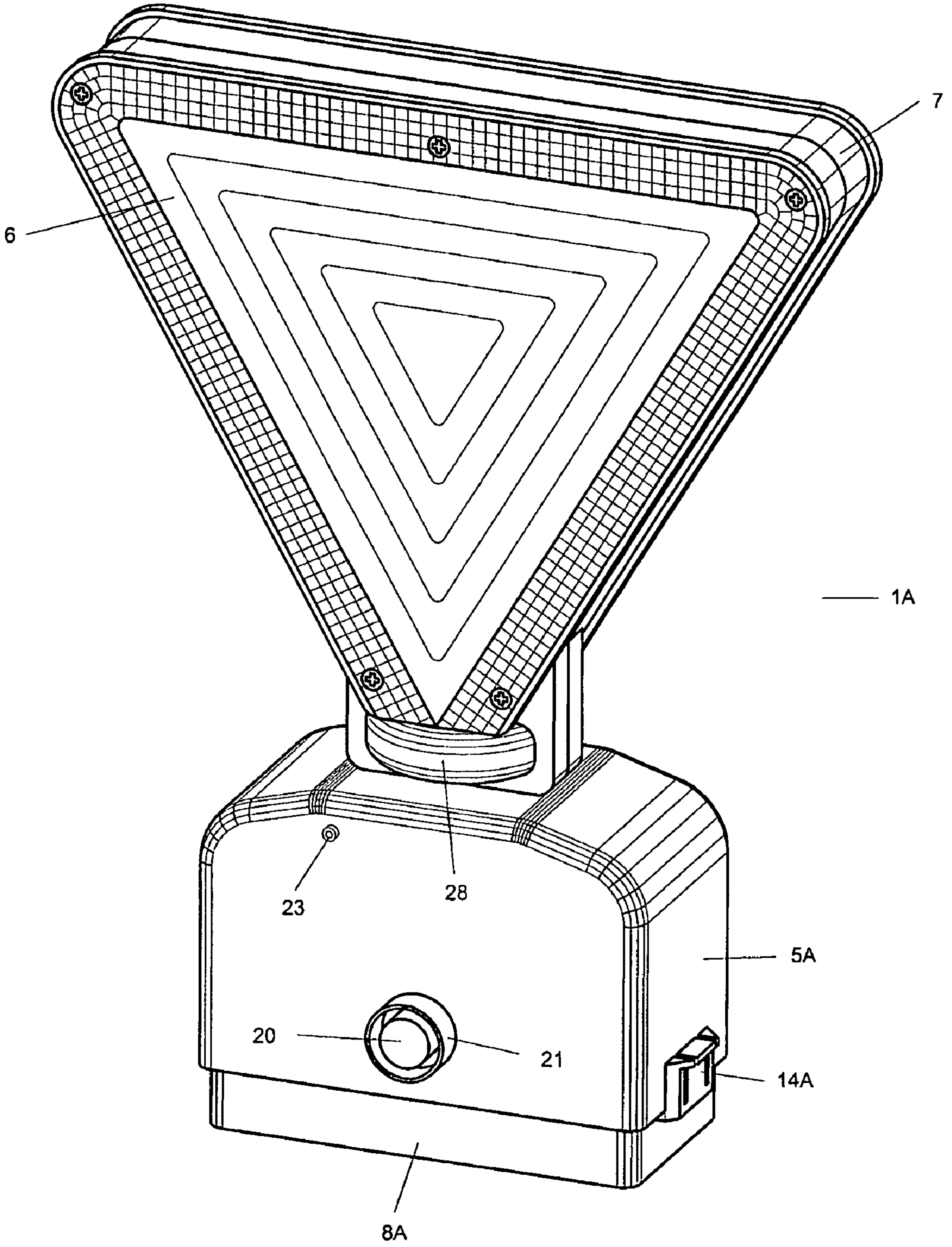
FIG. 5 is a perspective view of an alternative embodiment of a flashing warning light.
Figure 6:
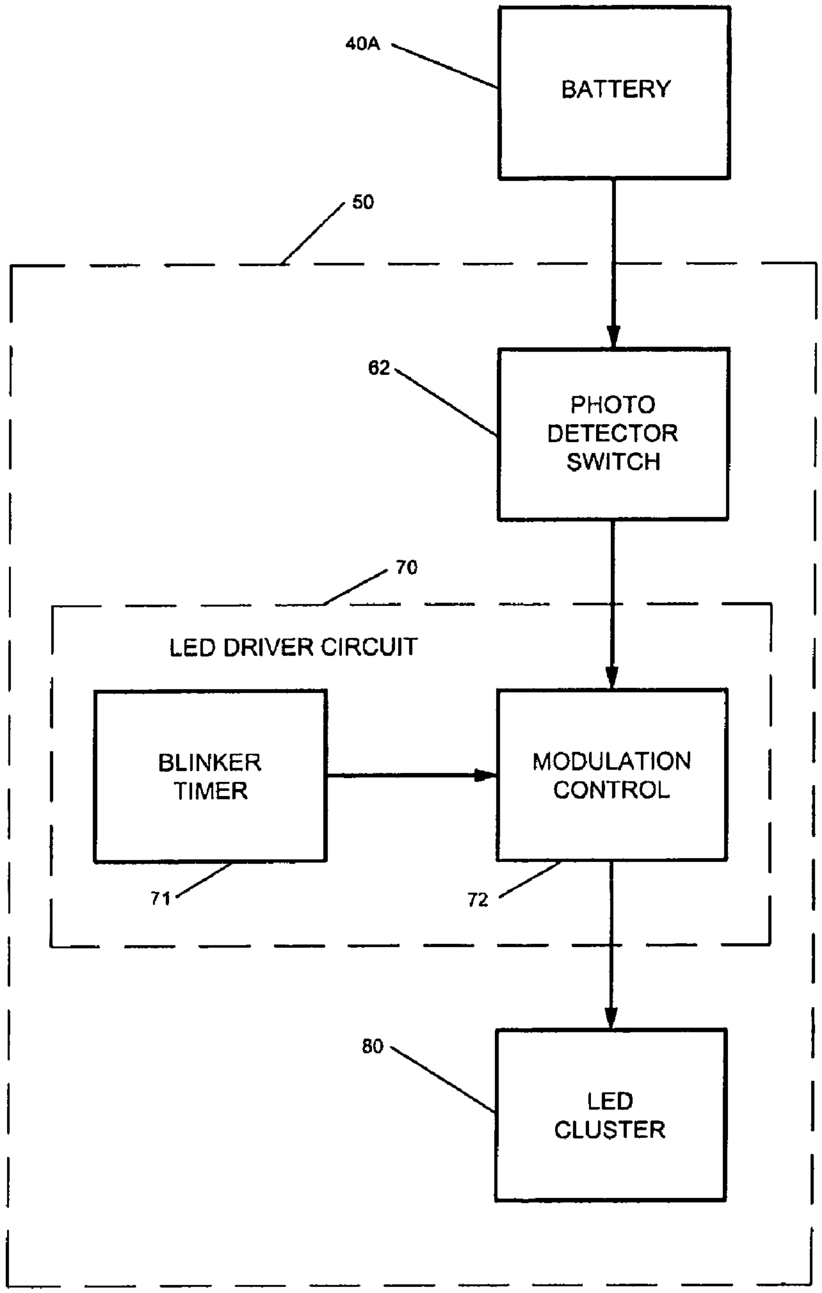
FIG. 6 is a block diagram of the flashing warning light of FIG. 5.
Figure 7:
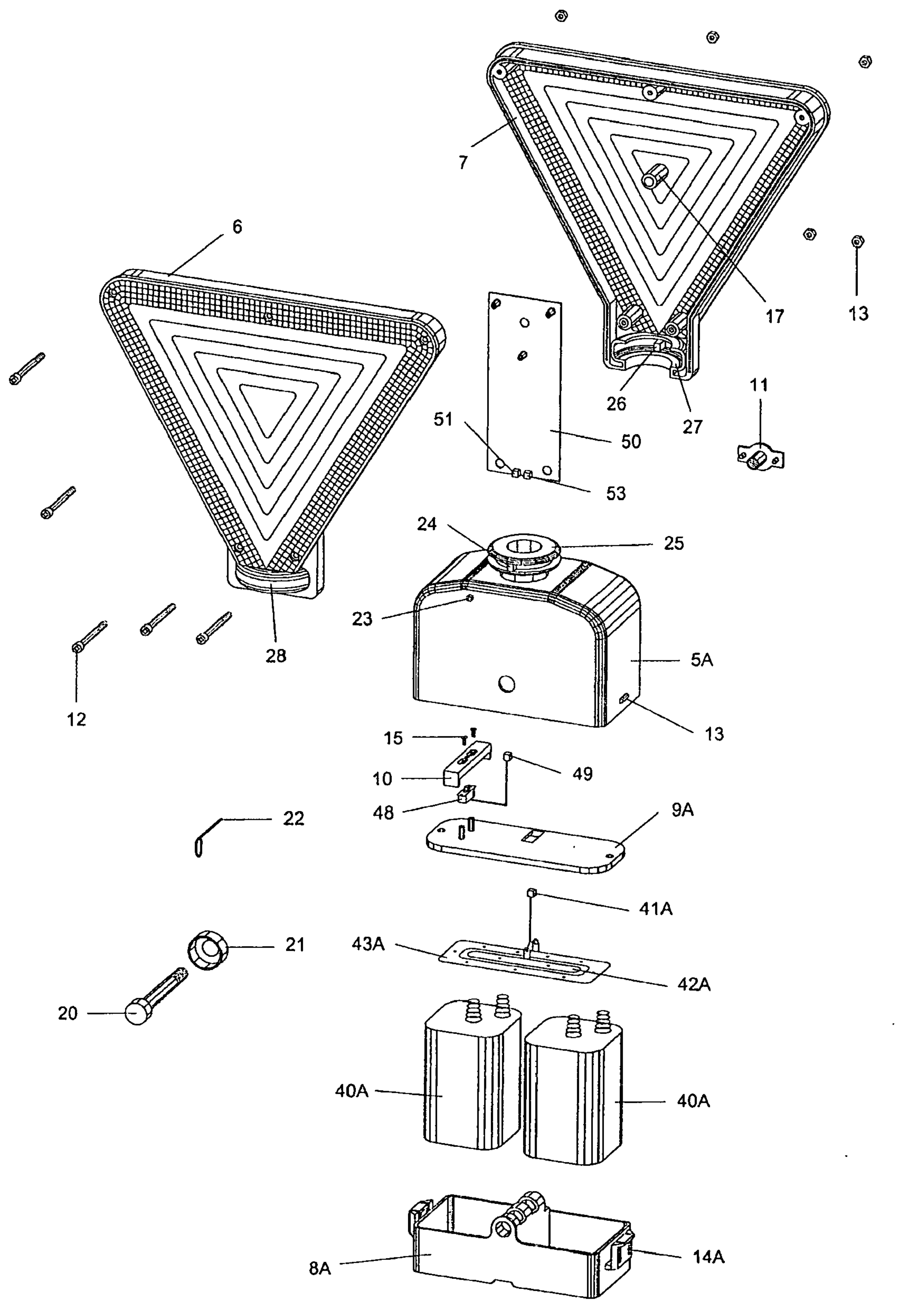
FIG. 7 is a perspective exploded view of the flashing warning light of FIG. 5.

With reference to FIGS. 5 and 7, flashing warning light 1*a* is similar in structure to the embodiment of FIGS. 1-4. The exceptions relate primarily to the battery, the battery compartment (housing 5*a*), battery contacts and circuitry as illustrated in FIGS. 6 and 8.

As illustrated in FIGS. 5 and 7, the alternative embodiment has a housing 5*a* which is shaped differently than that of the previously-described embodiment. Housing 5*a* is open on its bottom and is provided with tabs 13, only one of which is visible in the exploded perspective view of FIG. 7. Tabs 13 interact with retaining clips 14*a* which are formed on opposing ends of base 8*a*. Base 8*a* comprises two cavities which receive respective ones of non-rechargeable batteries 40*a*, as illustrated. Switch holder assembly 9*a* includes, attached to its underside, positive battery contact 42*a* and negative battery contact 43*a* which are positioned for contact with the respective poles of battery 40*a*. The remaining structural components of warning light 1*a* operate in substantially the same fashion as described above in connection with rechargeable flashing warning light 1.

FIG. 6 shows a block diagram of the electrical components and circuitry of warning light 1*a*. As illustrated, battery 40*a* is connected to photo detector switch 62 which, in turn, is connected to modulation control 72 of LED driver circuit 70. LED driver circuit 70 further includes blinker timer 71. Modulation control 72 is further connected to LED cluster 80. The operation of LED driver circuit 70 is substantially similar to that described above in connection with rechargeable flashing warning light 1.

Figure 8:
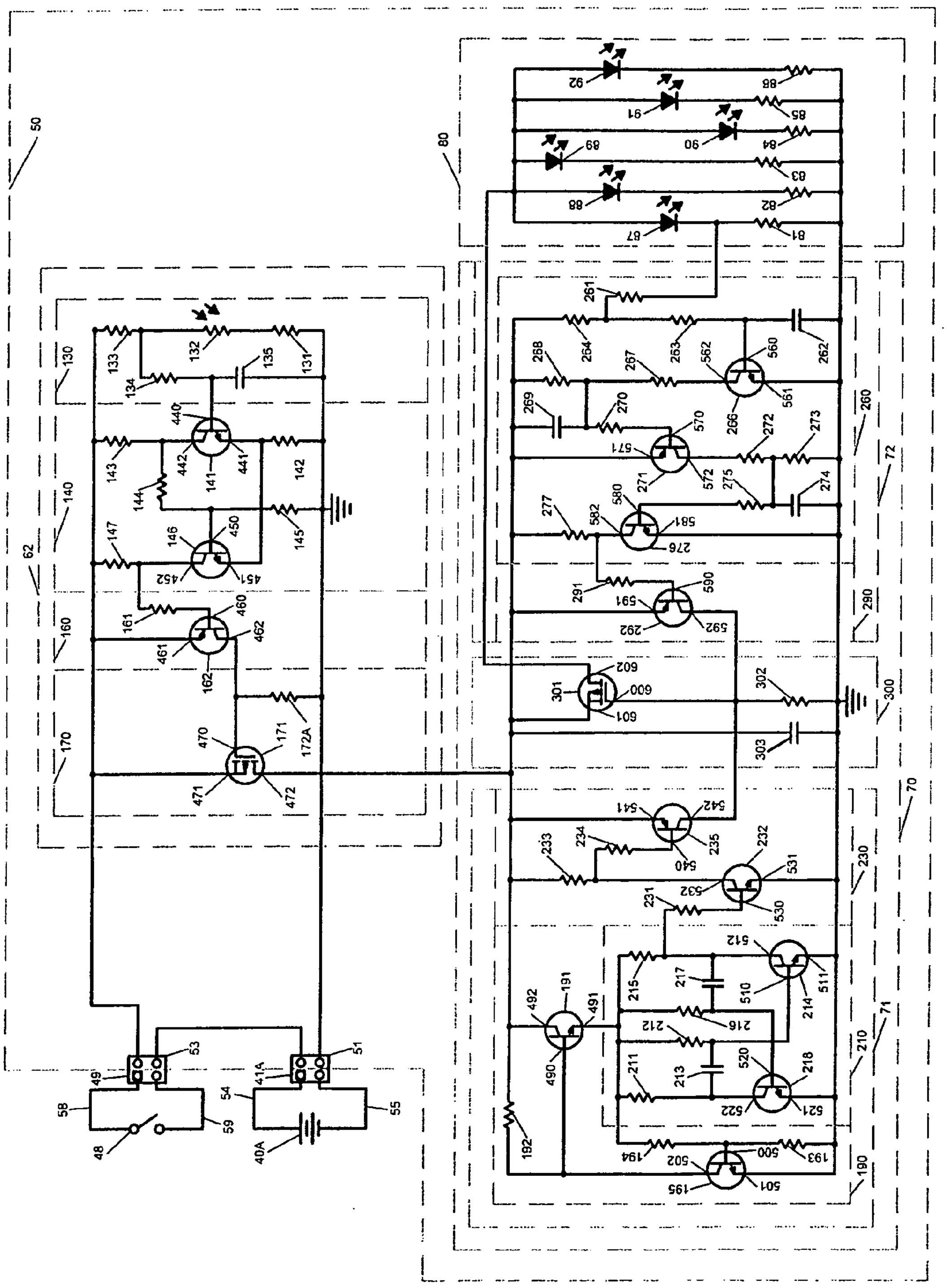
FIG. 8 is a schematic circuit diagram of the flashing warning light of FIG. 5.

With reference to FIG. 8, photo detector switch circuit 62 of circuit board 50 can be divided into four functional parts; photocell input circuit 130, Schmitt trigger circuit 140, level shifter circuit 160, and disconnect 170. The photo detector switch circuit 60 disconnects LED driver circuit 70 from battery(s) 40A when photocell 132 detects sunlight. When photocell 132 does not detect sunlight, photo detector switch circuit 60 connects LED driver circuit 70 to battery(s) 40A. These circuits are substantially similar to the corresponding circuits described above in connection with FIG. 4.

LED driver circuit 70 can also be divided into three functional parts; timer circuit 71, modulation control 72, and switch 300. The LED drive circuit modulates the LEDs to produce a consistent light output (5000-5500 Lux) during the entire discharge profile of the battery(s) 40A and blink every second with a 10 percent duty cycle. As illustrated, these circuits are essentially identical to the corresponding circuits described above in connection with FIG. 4.

When switch 48 is closed, battery(s) 40A is connected to the positive of circuit board 50 giving power to photo detector switch 62. Photo detector switch 62 works when the sun lowers the resistance across photoconductive cell 132 causing the voltage at base 440 of transistor 141 to lower. A low voltage at base 440 of 140 transistor 141 prevents current from flowing from its collector 442 to emitter 441. No current flowing through transistor 141 sets base 450 of transistor 146 by the voltage divider of resistor 145 with resistors 144 and 143. This voltage divider gives a high voltage at base 450 of transistor 146 allowing current to flow from its collector 452 to emitter 451 lowering collector 452 voltage. A low voltage on collector 452 of transistor 146 applies a low voltage at base 460 of transistor 162. A low voltage at base 460 of transistor 162 allows current to flow from its emitter 461 to collector 162 giving collector 462 a positive charge. A positive charge at collector 462 of transistor 162 places a positive charge on gate 470 of MOSFET 171. A positive charge on gate 470 of MOSFET 171 prevents current from flowing through from its source 471 to drain 472, which disconnects power to the LED driver circuit 70.

In one embodiment, the voltage of battery(s) 40A is 3.6 volts. In certain other respects, the circuit of FIG. 8 operates similarly to that of FIG. 4.

Although the above description refers to particular means, materials and embodiments, one skilled in the art can easily ascertain the essential characteristics of the present invention. Various changes and modifications may be made to adapt to various uses and characteristics without departing from the spirit and scope of the present invention as set forth in the following claims.

What is claimed is:

1. A warning light assembly, comprising:
- a source of electrical power, said source including a rechargeable battery;
- a solar panel;
- an LED light source;
- electrical circuitry operably connecting at least one of said source of electrical power and said solar panel to the LED light source;
- a housing enclosing said source of electrical power, said housing comprising a bottom, one or more sides, a top, and a mounting element on a surface of said top; and
- a triangular lens assembly enclosing the LED light source such that light from the light source is directed outwardly from the lens assembly, said lens assembly comprising a vertex and a substantially flat base opposite said vertex, and a mounting structure at said vertex, said mounting structure adapted to interact with the mounting element on the top of the housing to secure the lens assembly to the housing such that said flat base of the lens assembly is disposed above and substantially parallel to the top surface of the housing when the housing rests on its bottom;
- wherein said solar panel is operably mounted on the flat base of the lens assembly.

2. The warning light assembly of claim 1, wherein said mounting element on the top surface of the housing comprises a rotator ring, and wherein said mounting structure at said vertex of the triangular lens assembly comprises a rotator cup, and wherein said rotator ring mates with said rotator cup to rotatably secure the lens assembly to the housing.

3. The warning light assembly of claim 2, wherein one or both of said rotator cup and said rotator ring comprise a stop to limit the rotational movement of the lens assembly relative to the housing.

4. The warning light assembly of claim 1, wherein said triangular lens assembly comprises first and second triangular lenses, said lenses being formed of polypropylene, and wherein a portion of said mounting structure at said vertex is integrally formed as a part of each lens.

5. The warning light assembly of claim 4, wherein at least one of said portions of said mounting structures integrally molded as a part of said first and second triangular lenses further comprises an integrally formed stop.

6. The warning light assembly of claim 1, wherein the sides and the top of the housing are integrally formed of a plastic, and wherein said mounting element is integrally formed with the top surface of the housing.

7. The warning light assembly of claim 6, wherein said mounting element comprises a mounting ring, and wherein said mounting ring further comprises an integrally formed stop.

8. The warning light assembly of claim 1, wherein said lens assembly further comprises a circuit board enclosed within the lens assembly, said circuit board comprising a connector for releaseably receiving a mating connector electrically connected to the solar panel.

9. The warning light assembly of claim 1, wherein said triangular lens assembly comprises first and second triangular lenses, each lens having a groove integrally formed along a respective portions of each lens that together form said substantially flat base opposite the vertex, and wherein a portion of said solar panel is received in each groove to secure the solar panel to the lens assembly.

10. The warning light assembly of claim 1, wherein said electrical circuitry comprises a photo detector switch circuit which disconnects the source of electrical power from the LED light source when sunlight is detected, and which connects the source of electrical power to the LED light source when sunlight is not detected.

11. The warning light assembly of claim 10, wherein said photo detector circuit comprises a photo cell input circuit, a Schmitt trigger circuit, a level shifter circuit, and a disconnect.

12. A warning light assembly, comprising:
- a source of electrical power;
- an LED light source;
- electrical circuitry operably connecting said source of electrical power to said light source, and controlling the flow of electrical power to the light source; and
- a housing enclosing said source of electrical power, said housing comprising a bottom, one or more sides, a top, and an integrally-formed, mounting element on a surface of said top; and
- a triangular lens assembly enclosing the LED light source such that light from the light source is directed outwardly from the lens assembly, said lens assembly comprising a plurality of vertices and an integrally formed mounting structure at only one of said vertices, said mounting structure adapted to mate with the mounting element on the top of the housing to secure the lens assembly to the housing.

13. The warning light assembly of claim 12, wherein said mounting element on the top surface of the housing comprises a rotator ring, and wherein said mounting structure at said vertex of the triangular lens assembly comprises a rotator cup, and wherein said rotator ring mates with said rotator cup to rotatably secure the lens assembly to the housing.

14. The warning light assembly of claim 13, wherein one or both of said rotator cup and said rotator ring comprise a stop to limit the rotational movement of the lens assembly relative to the housing.

15. The warning light assembly of claim 12, wherein said triangular lens assembly comprises first and second triangular lenses, said lenses being formed of polypropylene, and wherein a portion of said mounting structure at said vertex is integrally formed as a part of each lens.

16. The warning light assembly of claim 15, wherein at least one of said portions of said mounting structures integrally molded as a part of said first and second triangular lenses further comprises an integrally formed stop.

17. The warning light assembly of claim 12, wherein the sides and the top of the housing are integrally formed of a plastic, and wherein said mounting element is integrally formed with the top surface of the housing.

18. The warning light assembly of claim 17, wherein said mounting element comprises a mounting ring, and wherein said mounting ring further comprises an integrally formed stop.

* * * * *